(12) United States Patent
Rossotto et al.

(10) Patent No.: US 9,217,375 B2
(45) Date of Patent: Dec. 22, 2015

(54) CONTROL METHOD FOR AN OVERSPEED SAFETY SYSTEM, AND AN ASSOCIATED SYSTEM AND AIRCRAFT

(75) Inventors: Régis Rossotto, Marseilles (FR); Hilario Vieira, Berre L'etang (FR)

(73) Assignee: Airbus Helicopters, Marignane (FR)

(*) Notice: Subject to any disclaimer, the term of this patent is extended or adjusted under 35 U.S.C. 154(b) by 610 days.

(21) Appl. No.: 13/613,594

(22) Filed: Sep. 13, 2012

(65) Prior Publication Data
US 2013/0247577 A1  Sep. 26, 2013

(30) Foreign Application Priority Data

Sep. 16, 2011  (FR) ...................................... 11 02811

(51) Int. Cl.
   *B64B 1/24*  (2006.01)
   *B64D 27/00*  (2006.01)
   *F02C 9/00*  (2006.01)
   *F01D 21/02*  (2006.01)

(52) U.S. Cl.
   CPC . *F02C 9/00* (2013.01); *F01D 21/02* (2013.01); *F05B 2260/3011* (2013.01); *F05D 2220/329* (2013.01); *F05D 2270/021* (2013.01); *F05D 2270/023* (2013.01); *F05D 2270/091* (2013.01); *F05D 2270/304* (2013.01)

(58) Field of Classification Search
   USPC ....... 244/53 R, 75.1, 76 R; 60/779, 772, 204; 701/3, 1
   See application file for complete search history.

(56) References Cited

U.S. PATENT DOCUMENTS

| | | | |
|---|---|---|---|
| 3,514,055 A | 5/1970 | Gregoire et al. | |
| 4,500,966 A | 2/1985 | Zagranski | |
| 4,638,781 A | 1/1987 | Shiki et al. | |
| 5,363,317 A | 11/1994 | Rice | |
| 5,403,155 A * | 4/1995 | Head et al. | 416/25 |
| 5,948,023 A | 9/1999 | Evans | |
| 6,915,639 B1 * | 7/2005 | Linebrink | 60/776 |
| 7,355,828 B2 | 4/2008 | Jones | |
| 2003/0056492 A1 * | 3/2003 | Henson | 60/39.281 |
| 2006/0217869 A1 * | 9/2006 | Horvath et al. | 701/100 |
| 2012/0116613 A1 * | 5/2012 | Daumas | 701/3 |
| 2012/0185129 A1 | 7/2012 | Carrier | |
| 2015/0006057 A1 * | 1/2015 | Domingo et al. | 701/99 |

FOREIGN PATENT DOCUMENTS

EP  1739436 A2  1/2007

OTHER PUBLICATIONS

Search Report and Written Opinion; Application No. FR1102811; dated May 5, 2012.

* cited by examiner

*Primary Examiner* — J. Woodrow Eldred
(74) *Attorney, Agent, or Firm* — Brooks Kushman P.C.

(57) ABSTRACT

A control method for controlling an overspeed safety system (5) of an aircraft (1) having at least a first engine (10) and a second engine (20), during which method an engine is shut down when a monitoring parameter of that engine exceeds a first threshold, and another engine distinct from this engine is shut down when the monitoring parameter for said other engine exceeds a second threshold, said second threshold being greater than said first threshold.

20 Claims, 2 Drawing Sheets

CONTROL METHOD FOR AN OVERSPEED SAFETY SYSTEM, AND AN ASSOCIATED SYSTEM AND AIRCRAFT

CROSS REFERENCE TO RELATED APPLICATIONS

The present application claims priority to French patent application FR 11 02811 filed on Sep. 16, 2011, the content of which is incorporated in its entirety by reference herein.

BACKGROUND OF THE INVENTION (1) Field of the Invention

The present invention relates to a control method for controlling an overspeed safety system, to such an overspeed safety system, and to an aircraft including such an overspeed safety system.

The invention relates to the general technical field of systems that provide operating safety for aircraft engines, in particular operating safety for a twin-engine helicopter or rotorcraft.

The present invention relates more particularly to protecting a twin-engine power plant in the event of one of its two engines suffering overspeed.

(2) Description of Related Art

A twin-engine rotorcraft generally includes first and second engines acting together to drive a main rotor providing lift and possibly also propulsion via a power drive train.

The first and second engines are generally controlled by respective first and second control units. Such control units are known by the acronym FADEC for the term "full authority digital engine control".

Each control unit may comprise a computer and control and monitoring peripherals constituting interfaces between the cockpit and the associated engine of the aircraft.

Among the kinds of engine concerned, particular use is made of free-turbine fuel-burning engines, in which a free turbine having at least one stage drives a shaft in rotation that engages with the power drive train.

In particular in the event of the power transmission train breaking or in the event of a freewheel in the power train slipping, the speed of rotation of the free turbine of an engine can increase considerably. The person skilled in the art then considers that such an engine is suffering overspeed, where such overspeed can lead to the engine running away and bursting.

Consequently, aircrafts are generally provided with safety systems to avoid overspeed in engines that might lead to events that are catastrophic for the aircraft and its occupants.

A mechanical system sometimes referred by the term "blade-shedding" may be applied to a free-turbine turbine engine.

Such a mechanical system consists in arranging shielding around the turbine and in facilitating the ejection of turbine blades as from a predetermined limiting speed of rotation.

Above the predetermined limit, a fuse element connecting each blade to a turbine hub breaks, for example. Each blade is then separated from the hub, with the blades nevertheless being contained inside the engine by the shielding.

That necessarily results in a reduction of the speed of rotation of the turbine, thus making it possible to stop the overspeed of the free turbine.

Engine overspeed is then stopped, but the engine is nevertheless partially destroyed.

An electronic system seeks to shut down the engines in order to avoid overspeed appearing.

The manufacturer then establishes a speed of rotation threshold for the free turbine in a turbine engine.

When the control unit of the engine detects overspeed, the control unit causes the engine to stop.

In that configuration, the engine is not damaged by the safety system.

Simultaneous overspeed of both turbine engines of an aircraft is also extremely rare.

Nevertheless, simultaneous overspeed may occur:

while the aircraft is performing a particularly severe maneuver causing both engines to reach the shut down threshold almost simultaneously, with both engines therefore being shut down;

in the event of failure of the electronics of the two control units; and/or in the event of a loss of the two connections between the respective engines and the power train.

The aircraft may then be in a difficult situation insofar as all of its engines have been shut down.

In a variant, the shutting down of one of the engines is inhibited in the event of the other engine being shut down because of overspeed. After a first engine is shut down, if the second engine then suffers overspeed, the second engine is not allowed to actuate its overspeed protection.

Under such circumstances, the second engine is no longer protected against overspeed. Such a situation is improbable, but not impossible. Consequently, the second engine may subsequently be in an overspeed condition, and the second engine cannot be shut down automatically because its protection is inhibited. The second engine therefore runs the risk of running away and bursting.

In another variant, it is possible to reengage the electronic protection against overspeed for the second engine in order to avoid such a risk.

It is also possible to consider analyzing various parameters in the event of overspeed in order to determine the origin of the phenomenon and decide on whether or not to shut down the second engine on exceeding the shut-down threshold.

It is possible to detect that the increase in the speed of rotation of the turbine of an engine is temporary. Under such circumstances, it is not necessarily useful to shut down the engine.

Furthermore, it should be observed that the technological background includes document U.S. Pat. No. 4,638,781, which discloses a device for cutting off the fuel feed to an engine.

The technical background also includes the following documents: U.S. Pat. No. 4,500,966, U.S. Pat. No. 5,363,317, U.S. Pat. No. 5,948,023, and EP 1 739 436.

Documents U.S. Pat. No. 4,500,966 and U.S. Pat. No. 5,363,317 refer to operating limits.

Document U.S. Pat. No. 5,948,023 refers to overspeed testing.

BRIEF SUMMARY OF THE INVENTION

The object of the present invention is to provide an alternative method firstly to avoid the bursting of engines in an aircraft, in particular a twin-engine aircraft, and secondly to avoid shutting down all of the engines of the aircraft if that is not essential.

According to the invention, a control method for controlling an overspeed safety system of an aircraft having at least a first engine and a second engine, is remarkable in particular in that an engine is shut down when a monitoring parameter of that engine exceeds a first threshold, and another engine distinct from said engine is shut down when the monitoring parameter for said other engine exceeds a second threshold, said second threshold being greater than said first threshold.

For example, the first engine is shut down on exceeding the first threshold, and the second engine is subsequently shut down only on exceeding the second threshold.

In the event of both engines being involved in overspeed, the monitoring parameter of each engine may reach and exceed the first threshold.

Nevertheless, contrary to certain prior art implementations, only one engine is then shut down.

In addition, unlike other prior art implementations, protection against overspeed for the other engine is not inhibited.

If the overspeed is due to a break in the power train, e.g. following an off-specification crash, then the monitoring parameter of the engine still in operation will exceed the second threshold. This engine in operation is then shut down on the grounds of safety.

In contrast, if the simultaneous overspeed results from a temporary phenomenon, possibly caused by a severe maneuver, the temporary phenomenon comes to an end before the engine that is in operation exceeds the second threshold. This engine therefore remains in operation.

Furthermore, this engine that is in operation conserves protection against overspeed.

This method may also include one or more of the following characteristics.

Each engine has a free turbine, and the monitoring parameter of an engine may be the speed of rotation of the free turbine of the engine.

It should be observed that the first threshold may be greater than a speed of rotation of the turbine known to the person skilled in the art as the "maximum transient speed of rotation". This maximum transient speed of rotation is a speed known to the manufacturers of rotorcraft and in particular helicopters, and the maximum transient speed of rotation may be reached as a result of a maneuver known by the term "quick stop" that consists in reducing and then increasing the collective pitch of the blades of the main rotor in order to cause the aircraft to take a nose-up attitude.

In another aspect, each engine has so-called "complementary" safety means acting on blades of a turbine, the safety means being activated from a predetermined limit of the monitoring parameter of the engine, and the second threshold is lower than said predetermined limit.

The safety means may consist in means of the "blade-shedding" type. In the event of accidental malfunction preventing the engine being shut down beyond the second threshold, the aircraft is protected by the complementary safety means.

Furthermore, each engine is fed with fuel by a respective booster pump, and, in a variant, the booster pump of an engine is shut down when the engine is shut down.

If the overspeed results from an accident that has led to the mechanical connection between the engine and the power transmission train being lost, a fire might be started or made worse by the supply of fuel. Shutting down the booster pump improves safety.

In addition, a first control unit may control a first engine and a second control unit may control a second engine. Each control unit may in particular serve to shut down the corresponding engine. Such a control unit may be of the conventional type known under the acronym FADEC.

In a first implementation, one control unit shuts down the associated engine at the first threshold providing the other control unit informs said one control unit that the other engine has not been shut down.

The control units thus "dialog" with each other in flight in order to determine which thresholds to apply to the engines they control.

For example, when the first control unit detects that monitoring parameter of the first engine has crossed the first threshold, the first control unit "interrogates" the second control unit.

If the second control unit indicates that the second engine has been shut down, then the first control unit does not shut down the first engine when it exceeds the first threshold. The first engine will not be shut down until the monitoring parameter for that first engine exceeds the second threshold.

Conversely, if the second control unit informs the first control unit that the second engine is operating, then the first control unit shuts down the first engine at the first threshold.

In another implementation, the thresholds to be applied are determined before the flight as such, and more precisely during a stage of starting the aircraft.

Thus, during a starting stage, it is determined, for example, that one control unit is to shut down the associated engine if the monitoring parameter of the associated engine exceeds the first threshold, while the other control unit should shut down the other engine if the monitoring parameter of the other engine exceeds the second threshold.

Consequently, independently of the implementation, each control unit is capable of shutting down the associated engine at two distinct thresholds, and the threshold to be applied by each control unit is determined at the beginning of the flight.

In a first implementation, a control unit associated with an engine determines which threshold to apply in flight as a function of the operating state of the other engine.

In contrast, in the second implementation, during the starting stage and thus before any engine monitoring parameter exceeds the first threshold, it is determined prior to takeoff and for the entire flight that one of the control units is to apply the first threshold to the engine it controls while the other control unit is to apply the second threshold to the engine it controls.

From one flight to another, a given control unit may implement two distinct thresholds.

These implementations make it possible to associate each engine with a threshold without any need for making specialized control units. Instead of manufacturing two distinct control units, each of which is programmed to apply a respective single threshold, control units are manufactured each of which is capable of applying either of the two thresholds that are provided. However, on starting, or in flight depending on the embodiment, the threshold that is to be applied by each control unit is selected while taking care that two distinct engines are associated with two distinct thresholds.

For example, in a first variant of the second implementation, each control unit is capable of shutting down the associated engine at a selected one of the first and second thresholds, and the threshold applied by each control unit is selected as a function of the order in which the control units are switched on.

The control unit that is switched on first may be referred to as the "master", while the control unit that is switched on second may be referred to as the "slave".

The "master" control unit that is switched on first may implement the first threshold, while the "slave" control unit that is switched on second may implement the second threshold. The first engine associated with the first control unit is shut down if its monitoring parameter exceeds the first threshold, while the second engine associated with the second control unit is shut down if its monitoring parameter exceeds the second threshold.

The inverse configuration is clearly also possible, with the "master" control unit that is switched on first implementing the second threshold, while the "slave" control unit that is switched on second implements the first threshold.

When the aircraft is started, the control units are never activated simultaneously, there is always some degree of time difference, even if very small.

Thus, when a control unit is switched on, the control unit may examine the state of the other control unit in order to determine whether it was switched on before said other control unit.

If so, this control unit becomes the "master" unit and implements the first threshold, for example. Otherwise, this control unit becomes the "slave" unit and implements the second threshold.

In a second variant, an external device distinct from the control units informs each control unit prior to takeoff of the threshold that it is to implement throughout the flight. The external device may involve external members of the mechanical, electrical, or avionics type.

The external device may apply a geographical criterion concerning positioning within the aircraft, by specifying, for convenience, that a "left" control unit is to apply one threshold and a "right" control unit is to apply the other threshold.

In a variant, the external device comprises an avionics member such as a computer, a processor, a segment of code, or any other equivalent means. The avionics member informs each control unit of the threshold to be applied, e.g. as a function of the above-mentioned geographical criterion.

In another variant, said external device comprises one external member per control unit, with an external member of one of the control units being different from the external member of the other control unit. The threshold to be applied by a control unit is then selected as a function of the associated external member.

It can be understood that the external member is distinct from one control unit to the other, so that this difference is recognized and leads to the first threshold being allocated to one of the two units and to the second threshold being allocated to the other control unit.

In an example, each external member comprises electric wiring, the electric wiring coming from a power supply and being connected to certain electrical inputs of the control unit. Depending on which inputs are powered, the control unit applies a particular one of the thresholds.

By using two different wiring layouts, it is ensured that the two control units apply two distinct thresholds.

It is also possible to use the technique known by the term "pin programming".

In another example, an external member includes means for activating a mechanical element of the control unit. Under the effect of the activation means, the mechanical element moves or deforms during installation of the control unit, the mechanical element then generating a particular electrical signal in the control unit that is associated with which threshold to apply.

For example, a first external member includes a support for the control unit having a finger that co-operates with a mechanical element of the first control unit in order to inform said first control unit of the threshold to be applied. In addition, a second external member includes a support for the control unit that does not have said finger so as to avoid activating the mechanical element of the second control unit in order to inform said second control unit which threshold to apply.

In a third embodiment, the control unit may be asymmetrical. Thus, a first control unit may be programmed to apply only one threshold while a second control unit is programmed to apply only the other threshold.

In addition to a method, the method also provides an overspeed safety system including at least a first engine and a second engine and implementing the method.

The safety system is remarkable in particular in that it includes a first control unit controlling the first engine and a second control unit controlling a second engine, each control unit co-operating with a measurement device for determining a monitoring parameter of the associated engine, one control unit executing instructions in order to shut down the associated engine when a monitoring parameter of that engine exceeds a first threshold, the other control unit executing instructions to shut down the other engine distinct from said engine when the monitoring parameter of said other engine exceeds a second threshold, said second threshold being greater than said first threshold.

Furthermore, each control element is optionally connected directly or indirectly to a booster pump of the associated engine, with the control unit shutting down the booster pump and the associated engine in the event of the appropriate threshold being exceeded.

Finally, the invention provides an aircraft including at least a first engine and a second engine.

This aircraft is remarkable in particular in that it includes an overspeed safety system of the above-described type.

BRIEF DESCRIPTION OF THE SEVERAL VIEWS OF THE DRAWINGS

The invention and its advantages appear in greater detail from the following description of embodiments given by way of illustration with reference to the accompanying Figures, in which.

DETAILED DESCRIPTION OF THE INVENTION

Elements that are present in more than one of the figures are given the same references in each of them.

Figure 1:
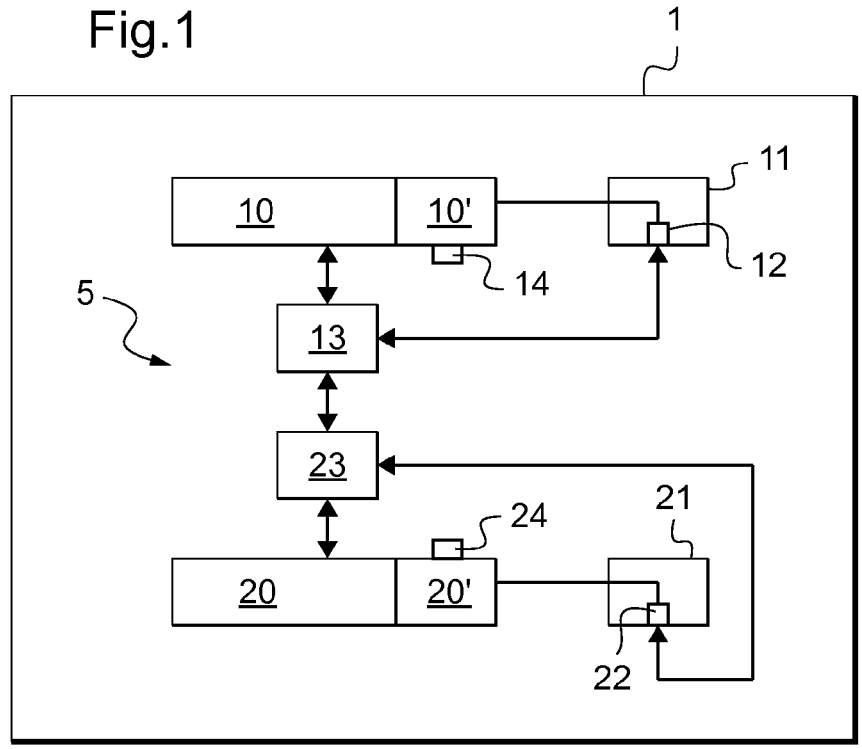
FIG. 1 is a diagram showing a first embodiment of the aircraft of the invention.

FIG. 1 shows an aircraft 1 in a first embodiment. It should be observed that the members of the aircraft that are not directly involved in the invention are not shown in the figures in order to avoid overloading the figures pointlessly.

Independently of the embodiment, the aircraft 1 includes at least two engines, namely a first engine 10 and a second engine 20.

Each engine 10, 20 may be a fuel-burning engine having a free turbine 10', 20', with the free turbine 10', 20' of the engines 10, 20 driving a power drive train connected at least to a lift-providing rotor.

In addition, the first and second engines 10 and 20 are respectively fed with fuel by a first booster pump 12 arranged in a first emergency tank 11 and by a second booster 22 arranged in a second emergency tank 21.

The aircraft is also provided with a safety system 5 in order to avoid overspeed of the first engine 10 and/or of the second engine 20.

This system 5 comprises a first control unit 13 controlling the first engine 10 and a second control unit 23 controlling the second engine. The control units may be conventional means known by the acronym FADEC. Each control unit then controls an engine that is said to be the "associated" engine or the "corresponding" engine.

Furthermore, the system 5 has a measurement device co-operating with the control units 13 and 23.

Thus, the measurement device includes a first member 14 for determining the value of a monitoring parameter of the first engine 10, this first member 14 communicating with the first control unit 13. Similarly, the measurement device includes a second member 24 for determining the value of a monitoring parameter of the second engine 20, this second member 24 communicating with the second control unit 23.

It should be observed that in the context of a turbine engine having a free turbine, the engine monitoring parameter may be the speed of rotation of each of the free turbines 10', 20' of the engines 10, 20.

Each control unit 13, 23 may then include a memory and program-execution means, e.g. of the processor or equivalent type. The execution means then execute instructions stored in the memory of the control unit in order to protect the associated engine, so as to prevent the overspeed phenomenon occurring on the associated engine.

According to the applied method, one control unit serves to shut down the associated engine when the monitoring parameter of that associated engine exceeds a first threshold, while the other control unit serves to shut down the other engine when the monitoring parameter of that other engine exceeds a second threshold distinct from the first threshold.

The second threshold is distinct from the first threshold in order to avoid the engines being shut down simultaneously, the second threshold being higher than the first threshold.

The first threshold and the second threshold are operating thresholds, and not thresholds that are applied only during testing.

In addition, each engine may include safety means acting on the blades of the turbines 10', 20' of the engines 10, 20 as from a predetermined limit of the monitoring parameters of those engines 10, 20.

These safety means are not shown in the figures in order to simplify the figures. Nevertheless, it should be observed that the safety means may be of the blade-shedding type, for example.

The second threshold is then advantageously lower than the predetermined limit.

Furthermore, in order to optimize safety, each control unit 13, 23 may cause the booster pump 12, 22 of the associated engine to be shut down after the associated engine has been shut down.

In order to reduce production costs and in order to facilitate maintenance of the aircraft, the first control unit 13 and the second control unit 23 are advantageously identical.

Each control unit is programmed to be capable of shutting down the associated engine by implementing the first threshold or the second threshold.

Consequently, in the first embodiment of FIG. 1, during flight and when a monitoring parameter of an engine exceeds the first threshold, the control units communicate with each other. Under such circumstances, one particular control unit shuts down the associated particular engine if the other control unit indicates to said particular control unit that the other engine has not been shut down as a result of overspeed.

By way of example, when the monitoring parameter for the first engine 10 exceeds the first threshold, the first control unit 13 communicates with the second control unit in order to discover the operating state of the second engine. If the second control unit 23 informs the first control unit that the second engine 20 is operating, then the first control unit shuts down the first engine 10 and possibly also the first booster pump 12. Otherwise, if the second engine has already been shut down following an overspeed, the first control unit shuts down the first engine 10 and optionally also the first booster pump 12 only in the event of the monitoring parameter of the first engine 10 exceeding the second threshold.

In another mode of operation, the first control unit to detect that a threshold has been exceeded sends an electrical signal to the other control unit, after which the other control unit applies the other threshold.

In the second embodiment described with reference to FIGS. 2 to 4, the thresholds applied by each control unit are set at the beginning of a flight, and preferably when the aircraft is started.

Thus, before the beginning of the flight as such, it is decided that one of the control units should shut down the associated engine when one of said programmed thresholds is exceeded, while the other control unit should shut down the other engine when the other programmed threshold is exceeded.

Consequently, one of the control units may be referred to as the "master", while the other control unit is referred to as the "slave".

The "master" control unit may then shut down the associated engine by implementing the first threshold, while the "slave" control unit may shut down the associated engine by implementing the second threshold. The inverse configuration may also be envisaged.

In a first variant of the second embodiment, the thresholds that are to be applied by each control unit are determined as a function of a time criterion. For example, the threshold applied by each control unit is selected as a function of the order in which the control units are switched on.

The control unit that is the first to start may for example become the "master" control unit, while the control unit that starts second becomes the "slave" control unit.

Figure 2:
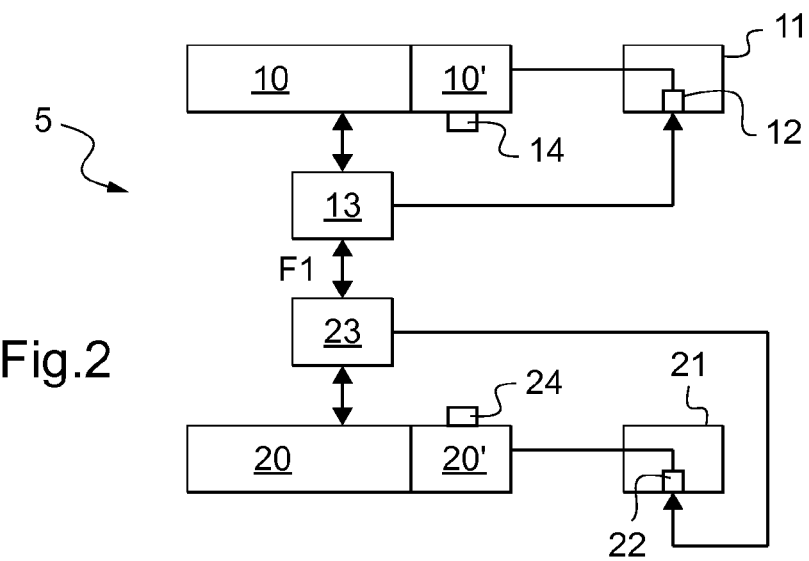
FIGS. 2 to 4 are diagrams showing a second embodiment of the aircraft of the invention.

For this purpose, and in an alternative of this first variant shown diagrammatically in FIG. 2, the control units communicate with each other on starting as represented by double-headed arrow F1.

When a control unit is switched on, that control unit determines the state of the other control unit in order to determine whether it is to take on the status of the "master" control unit or of the "slave" control unit.

For example, a given control unit that is starting immediately reads the starting signal of the other control unit. If the starting signal of the other control unit is absent, then the given control unit takes on the "master" status and immediately delivers its own starting signal. This starting signal will subsequently be read by the other control unit when it starts, and the other control unit will take on the "slave" status.

In a second variant, an external device distinct from the control unit informs each control unit of the threshold that it is to implement.

Figure 3:
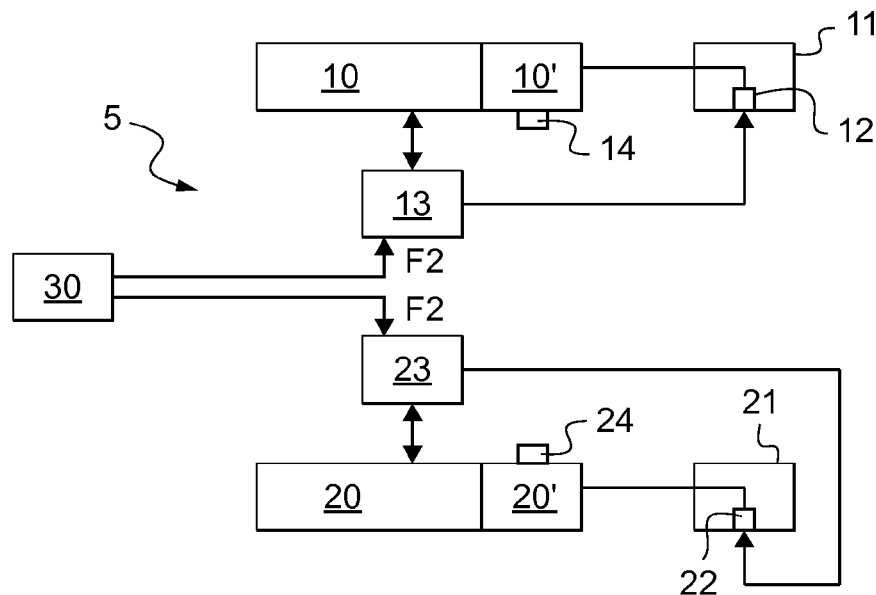

In the embodiment of this second variant shown diagrammatically in FIG. 3, the external device comprises an avionics member 30 communicating with both control units 13, 23, which avionics member may be dedicated to the system 5 or may perform other tasks.

The avionics member 30 may then inform the control unit that started first that it should act as a "master" control unit, and inform the control unit that started second that it should act as a "slave" control unit.

Alternatively, the avionics member may be programmed to allocate a threshold arbitrarily to each of the control units, e.g. depending on a geographical criterion.

Figure 4:
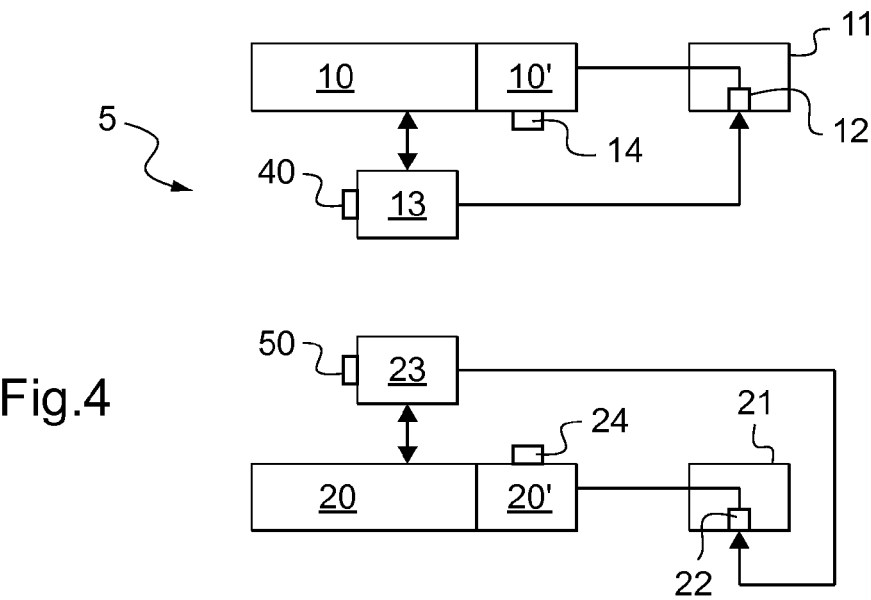

In the embodiment of this second variant shown diagrammatically in FIG. 4, the external device comprises one external member per control unit, namely an external member 40 for a control unit 13 that is different from the external member 50 for the other control unit 23. Each external member enables the associated control unit to determine which threshold to apply.

For example, each external member may comprise a mechanical member used for mounting the control unit, or indeed special electric wiring.

The thresholds to be applied by a particular control unit 13, 23 is thus selected as a function of its external member 40, 50, e.g. by keying that may be mechanical, electrical, or electronic. Each control unit determines the nature of the associated external control member and deduces therefrom which threshold to apply.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A control method for controlling an overspeed safety system of an aircraft having at least a first engine and a second engine, wherein an engine is shut down when a monitoring parameter of that engine exceeds a first threshold, and another engine distinct from said engine is shut down when the monitoring parameter for said other engine exceeds a second threshold, said second threshold being greater than said first threshold.

2. A method according to claim 1, wherein each engine has a free turbine, and said monitoring parameter of an engine is the speed of rotation of the free turbine of the engine.

3. A method according to claim 1, wherein each engine has safety means acting on blades of a turbine, said safety means being activated from a predetermined limit of the monitoring parameter of said engine, and said second threshold is lower than said predetermined limit.

4. A method according to claim 1, wherein each engine is fed with fuel by a respective booster pump, and the booster pump of an engine is shut down when the engine is shut down.

5. A method according to claim 1, wherein a first control unit controls a first engine and a second control unit controls a second engine, and when an engine exceeds the first threshold, the associated control unit:
   shuts down that engine at the first threshold if the other control unit informs it that the other engine has not been shut down; and
   shuts down the engine at the second threshold if the other control unit informs it that the other engine has been shut down.

6. A method according to claim 1, wherein a first control unit controls a first engine and a second control unit controls a second engine, and prior to takeoff and for an entire flight, it is determined that one of the control units should shut down the associated engine if the monitoring parameter of the associated engine exceeds the first threshold, while the other control unit should shut down the other engine if the monitoring parameter of the other engine exceeds the second threshold.

7. A method according to claim 6, wherein each control unit is capable of shutting down the associated engine at a selected one of the first and second thresholds, and the threshold applied by each control unit is selected as a function of the order in which the control units are switched on.

8. A method according to claim 7, wherein when a control unit is switched on, the control unit examines the state of the other control unit in order to determine whether it was switched on before the other control unit.

9. A method according to claim 6, wherein each control unit is capable of shutting down the associated engine at a selected one of the first and second thresholds, and an external device distinct from the control unit informs each control unit which threshold to implement.

10. A method according to claim 9, wherein said external device comprises one external member per control unit, with an external member of one of the control units being different from the external member of the other control unit, the threshold to be applied by a control unit being selected as a function of the associated external member.

11. An overspeed safety system including at least a first engine and a second engine, wherein the system includes a first control unit controlling the first engine and a second control unit controlling a second engine by implementing the method according to claim 1, each control unit co-operating with a measurement device for determining a monitoring parameter of the associated engine, one control unit executing instructions in order to shut down the associated engine when a monitoring parameter of that engine exceeds a first threshold, the other control unit executing instructions to shut down the other engine distinct from said engine when the monitoring parameter of said other engine exceeds a second threshold, said second threshold being greater than said first threshold.

12. A system according to claim 11, wherein each control unit is connected to a booster pump of the associated engine.

13. An aircraft including at least a first engine and a second engine, wherein the aircraft includes an overspeed safety system according to claim 11.

14. A method according to claim 1, wherein a first control unit controls a first engine and a second control unit controls a second engine, the first control unit being programmed to apply only one threshold, and the second control unit being programmed to apply only the other threshold.

15. A method according to claim 2 wherein the first threshold is greater than a maximum transient speed of rotation of the free turbine of the engine; and
   wherein the second threshold is set as a speed of rotation of the free turbine of the engine that is associated with a break in a powertrain of the aircraft.

16. A method of controlling an overspeed safety system of an aircraft comprising:
   shutting down a first engine in response to a first monitoring parameter of the first engine being above a first threshold; and
   shutting down a second engine in response to a second monitoring parameter of the second engine being above a second threshold and the first engine being shut down, the second threshold greater than the first threshold.

17. The method of claim 16 further comprising maintaining operation of the second engine after the first engine is shut down in response to the second monitoring parameter being below the second threshold.

18. The method of claim 17 wherein the first monitoring parameter is a free turbine speed of rotation of the first engine; and
   wherein the second monitoring parameter is a free turbine speed of rotation of the second engine.

19. The method of claim 17 wherein the first threshold is greater than a maximum transient speed of rotation of the free turbine of the engine.

20. The method of claim 18 wherein the second threshold is set as a speed of rotation of the free turbine of the engine that is associated with a break in a powertrain of the aircraft; and wherein the second threshold is less than a predetermined speed limit to activate a safety means acting on blades of the free turbine.

* * * * *